(12) United States Patent
Gielen et al.

(10) Patent No.: US 11,085,624 B2
(45) Date of Patent: Aug. 10, 2021

(54) LIGHTING UNIT WITH A PROTECTION CIRCUIT AND METHOD OF CONNECTING A LIGHTING UNIT AND A PROTECTION CIRCUIT

(71) Applicant: SIGNIFY HOLDING B.V., Eindhoven (NL)

(72) Inventors: Herman Johannes Gertrudis Gielen, Eindhoven (NL); Remco Christianus Wilhelmus Leermakers, Eindhoven (NL); Peter Hubertus Franciscus Deurenberg, Eindhoven (NL)

(73) Assignee: Signify Holding B.V., Eindhoven (NL)

( * ) Notice: Subject to any disclaimer, the term of this patent is extended or adjusted under 35 U.S.C. 154(b) by 0 days.

(21) Appl. No.: 16/961,632

(22) PCT Filed: Feb. 19, 2019

(86) PCT No.: PCT/EP2019/054027
§ 371 (c)(1),
(2) Date: Jul. 10, 2020

(87) PCT Pub. No.: WO2019/162245
PCT Pub. Date: Aug. 29, 2019

(65) Prior Publication Data
US 2021/0080093 A1    Mar. 18, 2021

(30) Foreign Application Priority Data

Feb. 23, 2018 (EP) ..................... 18158257

(51) Int. Cl.
*F21V 25/10* (2006.01)
*F21V 23/06* (2006.01)
(Continued)

(52) U.S. Cl.
CPC ............ *F21V 25/10* (2013.01); *F21V 23/003* (2013.01); *F21V 23/06* (2013.01); *H05B 45/50* (2020.01); *F21Y 2115/10* (2016.08)

(58) Field of Classification Search
CPC ........ F21V 25/10; F21V 23/003; F21V 23/06; H05B 45/50
See application file for complete search history.

(56) References Cited

U.S. PATENT DOCUMENTS 9,504,121 B2    11/2016  Moon et al.
2006/0197474 A1   9/2006  Olsen
(Continued)

FOREIGN PATENT DOCUMENTS

CN    103066568 B    4/2013
CN    206280769 U    6/2017
(Continued)

*Primary Examiner* — Joseph L Williams
(74) *Attorney, Agent, or Firm* — Daniel J. Piotrowski

(57) ABSTRACT

A lighting unit has an input connector which has a first terminal arrangement which connects to a protection circuit to engage a lighting driver in an initial connection of the lighting unit (14) and the lighting driver (12), and a second terminal arrangement which connects to a light source. The second terminal arrangement is adapted to engage the lighting driver later than an engagement of the first terminal arrangement to the light driver. The protection circuit (22) is adapted to operate earlier than an engagement of the light source (20) to the lighting driver (20). The protection circuit prevents current surges from being delivered by the lighting driver at the time of connection of the lighting unit. The protection circuit is only applied temporarily, before direct connection is made between the light source and the lighting driver.

15 Claims, 3 Drawing Sheets

(51) Int. Cl.
*F21V 23/00* (2015.01)
*H05B 45/50* (2020.01)
*F21Y 115/10* (2016.01)

(56) References Cited

U.S. PATENT DOCUMENTS

| | | |
|---|---|---|
| 2008/0247105 A1 | 10/2008 | Divan |
| 2010/0127625 A1 | 5/2010 | Minarczyk et al. |
| 2016/0327216 A1 | 11/2016 | Gielen et al. |
| 2016/0381760 A1 | 12/2016 | Xiong et al. |

FOREIGN PATENT DOCUMENTS

| | | |
|---|---|---|
| EP | 2432297 A2 | 3/2012 |
| JP | 2013004396 A | 1/2013 |
| KR | 20160120092 A | 10/2016 |
| WO | 2015063310 A2 | 5/2015 |

LIGHTING UNIT WITH A PROTECTION CIRCUIT AND METHOD OF CONNECTING A LIGHTING UNIT AND A PROTECTION CIRCUIT

CROSS-REFERENCE TO PRIOR APPLICATIONS

This application is the U.S. National Phase application under 35 U.S.C. § 371 of International Application No. PCT/EP2019/054027, filed on Feb. 19, 2019, which claims the benefit of European Patent Application No. 18158257.8, filed on Feb. 23, 2018. These applications are hereby incorporated by reference herein.

FIELD OF THE INVENTION

This invention relates to lighting units and lighting systems, in particular in which the lighting unit is pluggable into the lighting system.

BACKGROUND OF THE INVENTION

At present, lighting units (e.g. LED modules) are often integrated with their drivers, so that it is not possible for a consumer to replace an individual failed LED module within a lighting system having multiple such modules.

In future, LED modules will become exchangeable by the end consumer. This is driven by legislation relating to recycling requirements and by the need to replace individual failed modules.

During the replacement of LED modules, it would be most convenient for the user if the driver that is powering the system does not need to be switched off before exchanging the failed LED module. However, this presents the risk that a current surge may be delivered by the output stage of the driver to the module when the electrical connection is made to the LED module. This current surge may damage the LED module.

It would be desirable to implement a lighting system in which LED modules could be replaced without powering down the driver, which may be operating other LED modules.

EP2432297A2 discloses a LED module and a direct current power source. A current limiting circuit is in series connection with light sources in the LED module and the power source, upon the connection of the LED module to the direct current power source.

KR1020160120092A discloses a light emitting device module device with a protection section for protecting from overcurrent and overheating damage.

U.S. Pat. No. 9,504,121B2 discloses an AC direct lighting driver system including a surge protection circuit and a current limiting circuit.

US20060197474A1 discloses a modular lighting system.

US20160381760A1 discloses an LED tube lamp.

SUMMARY OF THE INVENTION

The invention is defined by the claims.

According to examples in accordance with an aspect of the invention, there is provided a lighting unit, comprising:
an input connector for receiving power from a lighting driver;
a light source; and
a protection circuit,
wherein the input connector comprises:

a first terminal arrangement which is adapted to connect to the protection circuit, and to engage the lighting driver in an initial connection of the lighting unit and the lighting driver; and
a second terminal arrangement which is adapted to connect to the light source, wherein the second terminal arrangement is adapted to engage the lighting driver later than an engagement of the first terminal arrangement to the lighting driver (12), thereby the protection circuit is adapted to operate earlier than an engagement of the light source to the lighting driver.

This lighting unit incorporates a protection circuit, which has the purpose of protecting the light source from current surges which may be delivered by the lighting driver at the time of connection. This may for example depend on the state of charge of an output capacitor of the driver. The protection circuit is applied, before direct connection is made between the light source and the lighting driver. If lighting units are exchanged without switching off the driver, any current peak delivered by the lighting driver output stage will be reduced before it reaches the light source. Thus the light source is better protected than the prior art wherein the protection takes places in the same time as the light source is connected to the power source, namely the protection simultaneously involving the light source. Here the term "engage" essentially means physically contact caused by a motion.

The protection circuit preferably comprises a current discharge circuit. The purpose is to discharge or partially discharge an output stage of the driver before the direct connection is made to the light source. This avoids a current surge through the lighting unit/light source.

The second terminal arrangement is isolated, in the lighting unit, from the first terminal arrangement. This allows an operation of the protection circuit without involving the light source, due to the isolation therebetween. Thus it is safe for the light source.

The protection circuit is preferably a passive circuit of resistive and/or reactive components which provide a discharge path between output terminals of the lighting driver.

In a first example, the protection circuit comprises a short between first and second terminals of the first terminal arrangement. This short provides a rapid discharge of any stored charge at the output of the lighting driver.

In a second example, the protection circuit comprises a resistor between first and second terminals of the first terminal arrangement. This provides a discharge path but the resistance performs a current limiting effect.

In a third example, the protection circuit comprises a series resistor between a first terminal of the first terminal arrangement and a first terminal of the second terminal arrangement. This resistor performs a current limiting effect in series with the light source thus enabling the light source to discharge the output stage of the driver, but with a reduced current.

Some of the possible protection circuit options may be combined. For example, the protection circuit may comprise a series resistor between a first terminal of the first terminal arrangement and a first terminal of the second terminal arrangement and a parallel resistor between the first terminal of the first terminal arrangement and a second terminal of the first terminal arrangement.

The first and second terminal arrangements may each comprise first and second terminals. The connection between the lighting driver and the light source may thus be a two-terminal connector. It may be connectable in either of the two orientations to simplify connection for the user.

The first terminal arrangement may be located at a more outward position of the input connector than the second terminal arrangement with respect to a direction of connection to the lighting driver, such that the first terminal arrangement is adapted to make contact with an output connector of the lighting driver earlier the second terminal arrangement.

The input connector thus implements a time sequence involving connection of the first terminal arrangement and then the second terminal arrangement, based on the physical in-series positioning of the terminal arrangements. This mechanical design ensures the time sequence of engagement and make the connection safe.

The first terminal arrangement and the second terminal arrangement may be adapted to both connect to the lighting driver after only the first terminal arrangement. In this way, the protection circuit remains connected while the second terminal arrangement is connected thus it is even safer for the light source since the protection circuit takes effect still.

Preferably, only the second terminal arrangement is adapted to connect to the light driver and the first terminal arrangement is decoupled from the lighting driver in a completed connection state. The protection circuit is applied only temporarily after the protection is done and the lighting unit has been completely connected to the lighting driver, in order to save power loss.

The light source preferably comprises a series and/or parallel arrangement of LEDs.

The invention also provides a lighting system comprising:
a lighting unit as defined above; and
a lighting driver, wherein the lighting driver comprises an output connector having a terminal arrangement with which the first terminal arrangement and then the second terminal arrangement are adapted to make contact, during connection of the input connector of the lighting unit to the output connector of the lighting driver.

The lighting unit may be connected to the lighting driver without turning off the lighting driver, because the connector design provides a current surge protection function.

The terminal arrangement of the output connector of the driver for example comprises first and second terminals. These two terminals connect in sequence with the two terminal arrangements of the light source.

The input connector and the output connector are for example for coupling together using a sliding push-fit. This provides a single motion for the user, so that the two-stage connection process is basically invisible to the user, who simply pulls a lighting unit out to remove it, and pushes a new one in.

The invention also provides a method of connecting a lighting unit to a lighting driver, comprising:
making an initial partial connection between an input connector of the lighting unit and an output connector of the lighting driver, by engaging a first terminal arrangement of the input connector of the lighting unit to the output connector and thereby connecting a protection circuit to the lighting driver meanwhile isolating a second terminal arrangement of the input connector, which is adapted to connect a light source of the lighting unit, from the output connector, thereby allowing the protection circuit to operate without involving the light source; and
after the initial partial connection, completing the connection between the input connector of the lighting unit and the output connector of the lighting driver, by engaging a second terminal arrangement of the input connector to the output connector and thereby connecting the light source of the lighting unit to the lighting driver.

The protection circuit for example comprises a current discharge circuit.

The method may comprise connecting both the first terminal arrangement and the second terminal arrangement to the output connector after the initial partial connection and before completing the connection.

These and other aspects of the invention will be apparent from and elucidated with reference to the embodiment(s) described hereinafter.

BRIEF DESCRIPTION OF THE DRAWINGS

Examples of the invention will now be described in detail with reference to the accompanying drawings, in which.

DETAILED DESCRIPTION OF THE EMBODIMENTS

Figure 1:
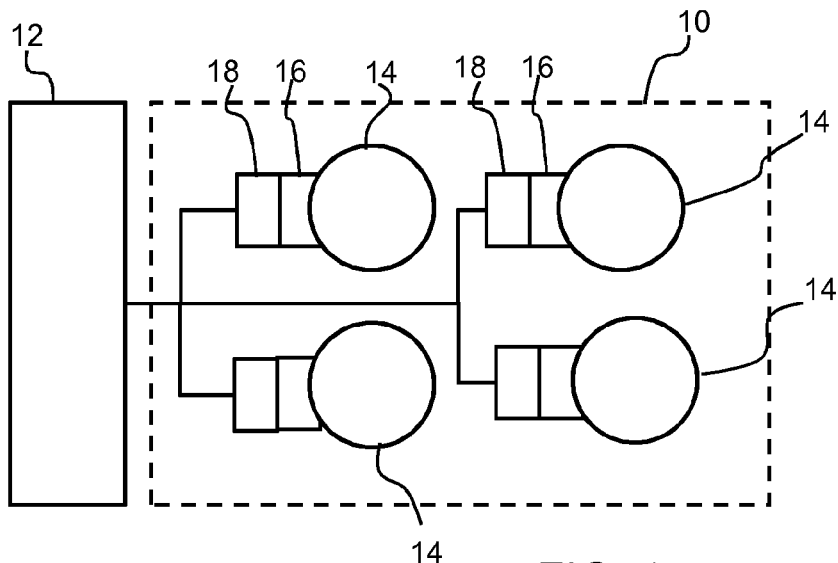
FIG. 1 shows a lighting system.

The invention will be described with reference to the Figures.

It should be understood that the detailed description and specific examples, while indicating exemplary embodiments of the apparatus, systems and methods, are intended for purposes of illustration only and are not intended to limit the scope of the invention. These and other features, aspects, and advantages of the apparatus, systems and methods of the present invention will become better understood from the following description, appended claims, and accompanying drawings. It should be understood that the Figures are merely schematic and are not drawn to scale. It should also be understood that the same reference numerals are used throughout the Figures to indicate the same or similar parts.

The invention provides a lighting unit which has an input connector which has a first terminal arrangement which connects to a protection circuit and a second terminal arrangement which connects to a light source. The second terminal arrangement is adapted for connection to a lighting driver after the first terminal arrangement. The protection circuit prevents current surges from being delivered by the lighting driver at the time of connection of the lighting unit. The protection circuit is only applied temporarily, before direct connection is made between the light source and the lighting driver.

FIG. 1 shows a lighting system comprising a lighting arrangement 10 and a lighting driver 12. Together, the driver 12 and the lighting arrangement may form a luminaire, in which lighting units 14 may be individually replaced in the event of failure or to perform a system upgrade or reconfiguration.

The lighting arrangement comprises a set of lighting units 14 (i.e. modules) each of which is driven by the driver 12. The lighting units each comprise a LED arrangement, which may comprise a series string of LEDs or a set of series strings of LEDs in parallel with each other. Each lighting unit 14 has an input connector 16.

The lighting units are driven in parallel by the driver 12. Four modules are shown in FIG. 1 but typically there may be one driver for one module, or for two modules connected in parallel.

The driver for example comprises a switch mode power supply (single stage or dual stage) which delivers a controlled current or voltage to the lighting units. However other driver types are possible such as a linear driver.

The lighting driver 12 comprises an output connector 18 for each lighting unit which connects to the input connector of the lighting unit. The connection is accessible to a user of the lighting system, who thus has the ability to change the LED lighting units in the same way that conventional bulbs may be replaced.

Figure 2:
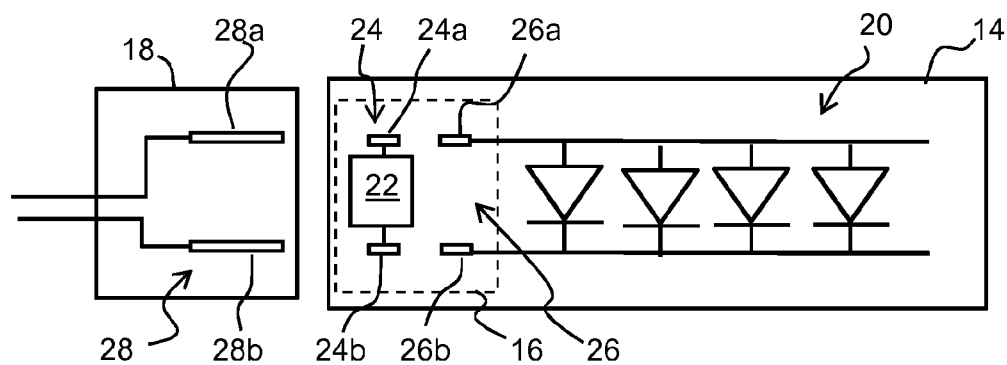
FIG. 2 shows one of the lighting units in more detail and the output connector of the driver.

FIG. 2 shows the lighting unit 14 with the input connector 16 shown in more detail as well as the output connector 18 of the driver.

The lighting unit 14 comprises the input connector 16 and the light source 20, namely the LED arrangement. The input connector 16 comprises a first terminal arrangement 24 which connects to a protection circuit 22. The first terminal arrangement is designed make electrical contact with the output connector of the driver when initial contact is made between the input and output connectors.

The connection operation involves a relative movement between the input and output connectors, and during this movement there is a transition from a first connection configuration to a second connection configuration. In the first connection configuration, the protection circuit connects to the driver output. The protection circuit performs a discharge function so that charge stored at an output stage of the driver is dissipated in a way which avoids a current surge through the lighting unit. The charge may be dissipated through a different path to the light source of the lighting unit, or it may pass through the light source but with a controlled (i.e. limited) current.

A second terminal arrangement 26 connects to the light source 20 to implement the second connection configuration.

The driver has a terminal arrangement 28 with which the first terminal arrangement 24 and then the second terminal arrangement 26 connect during connection of the input connector 16 to the output connector 18 of the lighting driver.

In the example shown, each terminal arrangement comprises first and second terminals. Thus, the first terminal arrangement 24 has a first terminal 24*a* and a second terminal 24*b*, the second terminal arrangement 26 has a first terminal 26*a* and a second terminal 26*b*, and the driver terminal arrangement 28 has a first terminal 28*a* and a second terminal 28*b*.

The protection circuit 22 is shown only schematically in FIG. 2. It comprises a current discharge circuit which is preferably formed of passive (reactive and/or resistive) components. This simplifies the structure, but it should be noted that active (i.e. semiconductor) components may also be used in the protection circuit.

Figure 3:
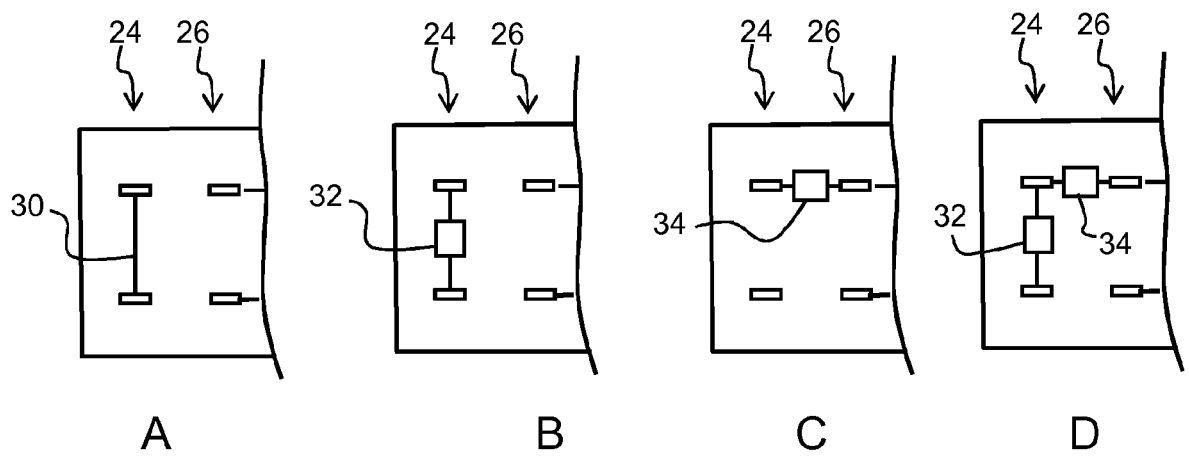
FIG. 3 shows various possible designs of protection circuit.

FIG. 3 shows some examples of possible protection circuits.

FIG. 3A shows a protection circuit in the form of a short 30 between the first and second terminals 24*a*, 24*b* of the first terminal arrangement 24. This short provides a rapid discharge of any stored charge at the output of the lighting driver.

FIG. 3B shows a protection circuit in the form of a resistor 32 between the first and second terminals 24*a*, 24*b* of the first terminal arrangement 24. This provides a discharge path but the resistance performs a current limiting effect.

FIG. 3C shows a protection circuit in the form of a series resistor 34 between the first terminal 24*a* of the first terminal arrangement 24 and the first terminal 26*a* of the second terminal arrangement 26. This resistor performs a current limiting effect in series with the light source thus enabling the light source to discharge the output stage of the driver, but with a reduced current.

FIG. 3D shows a protection circuit in the form of a series resistor 34 between the first terminal 24*a* of the first terminal arrangement and the first terminal 26*a* of the second terminal arrangement and a parallel resistor 32 between the first terminal 24*a* of the first terminal arrangement and the second terminal 24*b* of the first terminal arrangement.

Thus, some of the possible protection circuit options may be combined.

Figure 4:
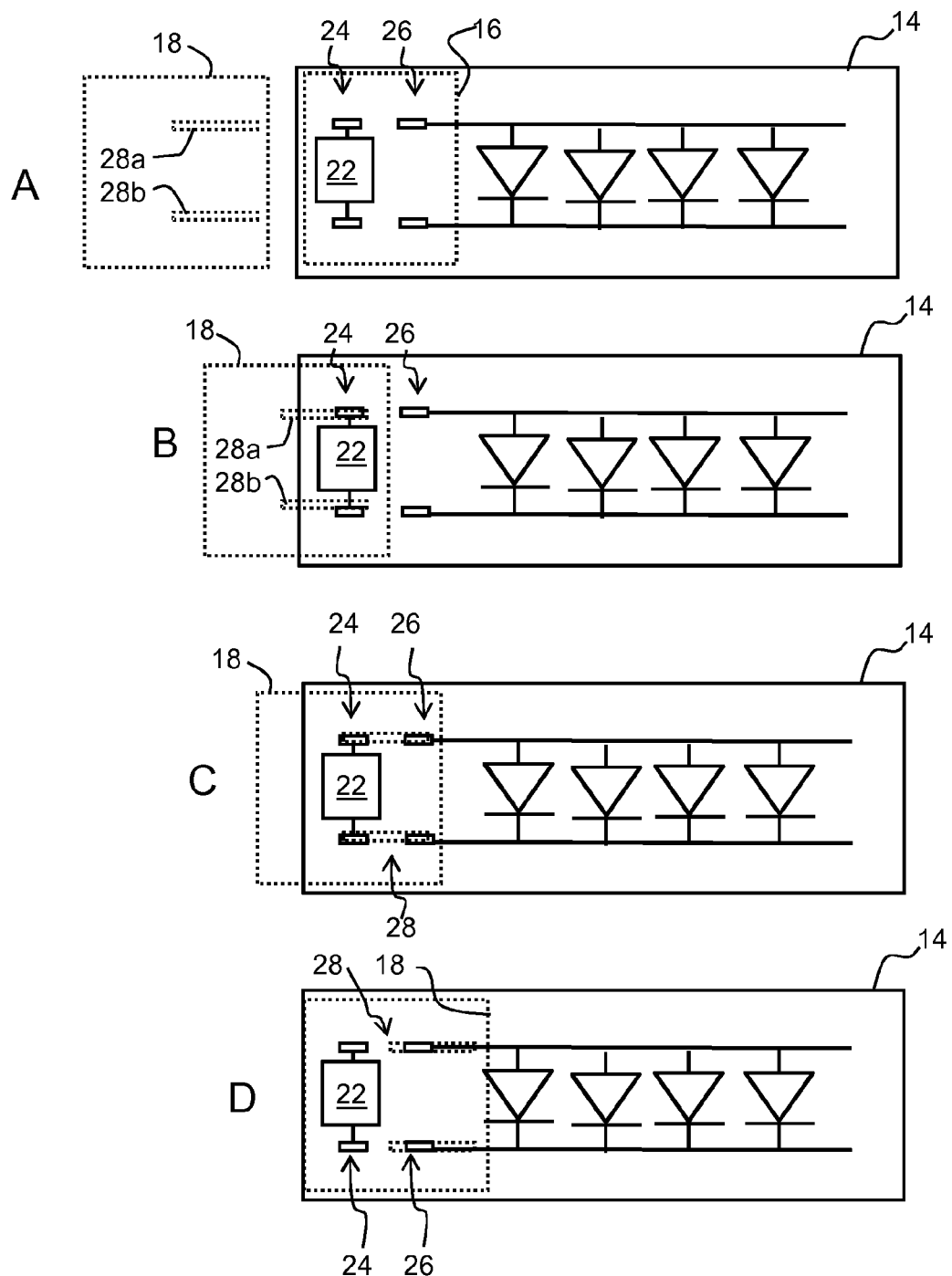
FIG. 4 shows a connection sequence implemented when a lighting unit is changed.

The first terminal arrangement 24 is located at a more outward position of the input connector 16 than the second terminal arrangement 26, such that the first terminal arrangement makes the initial contact with the output connector as explained above. The connection process is shown in FIG. 4.

FIG. 4A shows the lighting unit input connector 16 and driver output connector 18 separated.

FIG. 4B shows the initial connection between the two connectors. The terminal arrangement 28 of the driver contacts only the first terminal arrangement 24 so that the protection circuit (no matter what form it takes) is connected to the driver output, and it operates to discharge the output stage of the driver.

FIG. 4C shows further coupling of the connectors. In the configuration shown, the terminal arrangement 28 of the driver connects to both of the lighting unit terminal arrangements at the same time. In this way, there is no time period during which the driver output is not protected before connection of the lighting unit is completed. However, there may be disconnection from the first terminal arrangement before connection of the second terminal arrangement, for example if the time period between the two configurations does not give sufficient time for potentially hazardous charges to build up. This time period however depends on the speed of movement when making the connection, and it may also be possible that a user can stop making the connection when between the two configurations. Thus, it is preferable to have temporary simultaneous connection to both terminal arrangements.

FIG. 4D shows the completed connection. The terminal arrangement 28 no longer makes contact with the first terminal arrangement 24 so the protection circuit does not impact on the desired operation of the driver.

Figure 5:
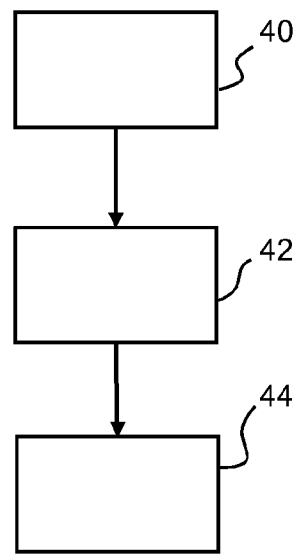
FIG. 5 shows a method of connecting a lighting unit.

FIG. 5 shows a method of changing a lighting unit 14.

In step 40, a failed lighting unit is removed by disconnecting an output connector (which is coupled to the driver) and an input connector of the lighting unit.

Steps 42 and 44 involve connecting a replacement lighting unit 14 to the lighting driver.

In step 42, an initial partial connection is made between the input connector 16 of the lighting unit and the output connector 18 of the lighting driver, thereby connecting the first terminal arrangement 24 of the input connector of the lighting unit to the output connector 18 and thereby connecting the protection circuit 22 to the lighting driver.

In step 44, the connection is completed between the input connector 16 and the output connector 18 of the lighting driver, thereby connecting the second terminal arrangement 26 of the input connector to the output connector 18 to connecting the light source 20 of the lighting unit 14 to the lighting driver 12.

Between steps 42 and 44, both the first terminal arrangement and the second terminal arrangement may be connected to the output connector at the same time.

Figures 6, 7:
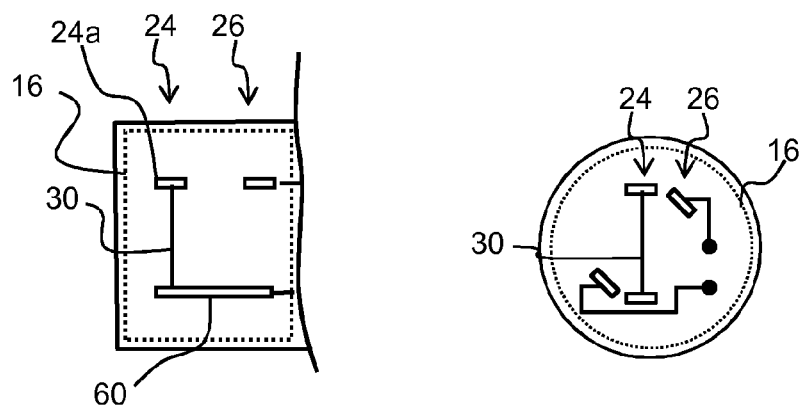
FIG. 6 shows a first alternative design for the input connector to the lighting unit.
FIG. 7 shows a second alternative design for the input connector to the lighting unit.

In the example above, there is a separate pair of terminals in the first terminal arrangement and in the second terminal arrangement. However, there may be a shared terminal as shown in FIG. 6. In this case, the terminals 24b and 26b have been replaced by a single terminal 60. As soon as contact is broken to the terminal 24a, the protection circuit becomes floating and thus performs no function even though the contact 60 is still used.

In the example above, there is a push fit between the input connector 16 and the output connector 18. In such an example, the first terminal arrangement is located at a more outward position of the input connector than the second terminal arrangement. Thus, during a first part of the push fit, the first terminal arrangement engages, and at an end part of the push fit, the second terminal arrangement engages. This is a seamless operation for the user.

However, the invention is applicable more generally whenever there is a two-stage connection process caused by the movement of the two connectors, as is required to mechanically couple them.

FIG. 7 shows an arrangement suitable for a push and rotate coupling, similar to a bayonet coupling. The initial coupling between the connectors makes contact between the driver terminal arrangement 28 (not shown in FIG. 7) and the first terminal arrangement 24, and rotation between the connectors then makes contact instead with the second terminal arrangement 26.

The examples above all show terminal arrangement with two terminals. However, this is not essential, and there may be terminal arrangements with more than two terminals.

The example above shows one driver shared between multiple lighting units (i.e. modules). However, each lighting unit may be associated with its own driver.

The protection circuit is typically for discharging an output stage, such as an output capacitor, of the driver. A current spike is either prevented completely or it is reduced to a level that does not damage the LED load. Resistors and shorts have been shown in the examples above for simplicity, but there may equally be RC (resistor-capacitor) circuits or even active circuitry.

The invention is of primary interest for LED lighting, but the same principles can be applied to other solid state lighting solutions, and will be of interest for any lighting technology for which it is desirable to prevent a current surge.

Other variations to the disclosed embodiments can be understood and effected by those skilled in the art in practicing the claimed invention, from a study of the drawings, the disclosure, and the appended claims. In the claims, the word "comprising" does not exclude other elements or steps, and the indefinite article "a" or "an" does not exclude a plurality. The mere fact that certain measures are recited in mutually different dependent claims does not indicate that a combination of these measures cannot be used to advantage. Any reference signs in the claims should not be construed as limiting the scope.

The invention claimed is:

1. A lighting unit, comprising:
   an input connector for receiving power from a lighting driver;
   a light source; and
   a protection circuit,
   wherein the input connector is adapted to connect to the lighting driver through a relatively spatial movement, and the input connector comprises:
      a first terminal arrangement which is adapted to connect to the protection circuit, and to engage terminals of the lighting driver in an first movement point in the relatively spatial movement to connect the lighting unit and the lighting driver; and
      a second terminal arrangement which is adapted to connect to the light source, wherein the second terminal arrangement is adapted to engage the terminals of the lighting driver in a second movement point happening later than the first movement point along the relatively spatial movement,
   thereby the protection circuit is adapted to operate earlier than an engagement of the light source to the lighting driver.

2. A lighting unit as claimed in claim 1, wherein the protection circuit comprises a current discharge circuit adapted to discharge an output stage of the lighting driver, and
   the second terminal arrangement is isolated, in the lighting unit, from the first terminal arrangement.

3. A lighting unit as claimed in claim 1, wherein the protection circuit comprises a short between first and second terminals of the first terminal arrangement.

4. A lighting unit as claimed in claim 1, wherein the protection circuit comprises a resistor between first and second terminals of the first terminal arrangement.

5. A lighting unit as claimed in claim 1, wherein the protection circuit comprises a series resistor between a first terminal of the first terminal arrangement and a first terminal of the second terminal arrangement, and a second terminal of the first terminal arrangement is isolated from a second terminal of the second terminal arrangement.

6. A lighting unit as claimed in claim 1, wherein the protection circuit comprises a series resistor between a first terminal of the first terminal arrangement and a first terminal of the second terminal arrangement and a parallel resistor between the first terminal of the first terminal arrangement and a second terminal of the first terminal arrangement, and the second terminal of the first terminal arrangement is isolated from a second terminal of the second terminal arrangement.

7. A lighting unit as claimed in claim 1, wherein the first and second terminal arrangements each comprise first and second terminals.

8. A lighting unit as claimed in claim 1, wherein the first terminal arrangement is located at a more outward position of the input connector than the second terminal arrangement with respect to a direction of connection to the lighting driver, such that the first terminal arrangement is adapted to make contact with an output connector of the lighting driver earlier than the second terminal arrangement when the lighting unit is connected to the lighting driver by the relatively spatial movement.

9. A lighting unit as claimed in claim 1, wherein
   only the first terminal arrangement is adapted to connect to the light driver in the first movement point,
   the first terminal arrangement and the second terminal arrangement are adapted to both connect to the lighting driver in a further movement point later than the first movement point, and only the second terminal arrangement is adapted to connect to the light driver and the first terminal arrangement is decoupled from the lighting driver in the second movement point.

10. A lighting system comprising:
a lighting unit as claimed in claim 1; and
a lighting driver, wherein the lighting driver comprises an output connector having a terminal arrangement adapted to contact the first terminal arrangement earlier than to contact the second terminal arrangement, during connection of the input connector of the lighting unit to the output connector of the lighting driver.

11. A lighting system as claimed in claim 10, wherein the terminal arrangement of the output connector comprises first and second terminals.

12. A lighting system as claimed in claim 10, wherein the input connector and output connector are adapted to couple together using a sliding push-fit.

13. A method of connecting a lighting unit to a lighting driver, comprising:
moving the lighting unit in a relative spatial movement to the lighting driver, reaching a first movement point where engaging a first terminal arrangement of the input connector of the lighting unit to the output connector and thereby connecting a protection circuit to the lighting driver, meanwhile isolating a second terminal arrangement of the input connector, which second terminal arrangement is adapted to connect a light source of the lighting unit, from the output connector, thereby allowing the protection circuit to operate without involving the light source; and
continuing moving the lighting unit from the first movement point to reach a second movement point, where completing the connection between the input connector of the lighting unit and the output connector of the lighting driver, and engaging the second terminal arrangement of the input connector to the output connector and thereby connecting the light source of the lighting unit to the lighting driver.

14. A method as claimed in claim 13, wherein the protection circuit comprises a current discharge circuit adapted to discharge an output stage of the lighting driver which avoids a current surge through the lighting source.

15. A method as claimed in claim 13, where said step of reaching the first movement point comprising
engaging the first terminal arrangement of the input connector of the lighting unit to the output connector in a first trip of a push fit, wherein the first trip reaches the first movement point;
said step of reach a second movement point comprising
continuing moving the lighting unit from the first movement point to reach a further movement point, where engaging both the first terminal arrangement and the second terminal arrangement to the output connector in a second trip of the push fit, wherein the second trip follows the first trip and reaches the further movement point, and
continuing moving the lighting unit from the further movement point to reach the second movement point, where engaging only the second terminal arrangement of the input connector to the output connector and isolating the first terminal arrangement from the output connector in a third trip of the push fit so as to complete the connection, wherein the third trip follows the second trip and reaches the second movement point.

* * * * *